(12) United States Patent
Fang

(10) Patent No.: US 10,046,892 B2
(45) Date of Patent: Aug. 14, 2018

(54) TAMPER-EVIDENT DEVICE AND VALVE USING SAME

(71) Applicant: SHANGHAI HONGYAN RETURNABLE TRANSIT PACKAGINGS CO., LTD., Shanghai (CN)

(72) Inventor: Zhengwei Fang, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 81 days.

(21) Appl. No.: 15/108,499

(22) PCT Filed: Dec. 26, 2014

(86) PCT No.: PCT/CN2014/095154
§ 371 (c)(1),
(2) Date: Jun. 27, 2016

(87) PCT Pub. No.: WO2015/096810
PCT Pub. Date: Jul. 2, 2015

(65) Prior Publication Data
US 2016/0318678 A1 Nov. 3, 2016

(30) Foreign Application Priority Data

Dec. 26, 2013 (CN) .......................... 2013 1 0732638

(51) Int. Cl.
*B65D 55/06* (2006.01)
*F16L 35/00* (2006.01)
(Continued)

(52) U.S. Cl.
CPC ......... *B65D 55/06* (2013.01); *B65D 88/1612* (2013.01); *B65D 90/22* (2013.01);
(Continued)

(58) Field of Classification Search
CPC . B65D 55/06; Y10T 137/7069; Y10T 137/71; F16K 35/00–35/16
(Continued)

(56) References Cited

U.S. PATENT DOCUMENTS 4,460,100 A * 7/1984 Libit .................... B65D 41/325
215/237
4,616,763 A * 10/1986 Ruhl ...................... B65D 41/62
137/377

(Continued)

FOREIGN PATENT DOCUMENTS

CN 1136132 1/2004
CN 2640951 9/2004
(Continued)

OTHER PUBLICATIONS

International Search Report for international application No. PCT/CN2014/095154, dated Mar. 25, 2015 (6 pages, including English translation).

(Continued)

*Primary Examiner* — Kevin Murphy
(74) *Attorney, Agent, or Firm* — Hamre, Schumann, Mueller & Larson, P.C.

(57) ABSTRACT

A tamper-evident device for valves comprises: an anti-theft buckle (1), provided with an anti-theft buckle body (17), a pulling portion (4), a tearable portion (5), an elastic hook (7), and a position limiting surface (6); an anti-theft cover (2), provided with a position limiting contour (8) and a hook receiving portion (9); and a position limiting slot (10) provided at a passage outlet (13) of a valve body (3). During use, the anti-theft cover (2) is connected to the passage outlet (13), and the elastic hook (7) is hooked to the hook receiving portion (9) and fitted to position limiting slot (10) to limit relative positions of the anti-theft cover (2) and the valve body (3). Also disclosed is a valve having the temper- (Continued)

evident device. The temper-evident device is easy to open and can effectively prevent stored materials from being stolen.

10 Claims, 10 Drawing Sheets

(51) Int. Cl.
*B65D 88/16* (2006.01)
*B65D 90/22* (2006.01)
*F16L 55/115* (2006.01)

(52) U.S. Cl.
CPC ........... *F16L 35/00* (2013.01); *F16L 55/1152* (2013.01); *Y02W 30/807* (2015.05); *Y10T 137/7069* (2015.04); *Y10T 137/71* (2015.04)

(58) Field of Classification Search
USPC .......................................... 220/270; 138/89
See application file for complete search history.

(56) References Cited

U.S. PATENT DOCUMENTS

| 4,830,208 | A | * | 5/1989 | Osting | ............... | B65D 55/0845 |
| | | | | | | 215/252 |
| 5,197,619 | A | | 3/1993 | Margaria | | |
| 5,303,837 | A | * | 4/1994 | Adams | ................. | B65D 5/749 |
| | | | | | | 215/214 |
| 5,893,475 | A | | 4/1999 | May | | |
| 6,152,316 | A | | 11/2000 | Niese | | |
| 6,854,616 | B2 | * | 2/2005 | Steffan | .................. | B65D 59/06 |
| | | | | | | 215/254 |
| 7,152,760 | B1 | * | 12/2006 | Peabody | ................ | B65D 41/48 |
| | | | | | | 222/153.07 |
| 8,292,104 | B2 | * | 10/2012 | Cheng | ................ | B65D 41/3438 |
| | | | | | | 215/228 |
| 2004/0026421 | A1 | * | 2/2004 | Holm | ..................... | B65D 15/08 |
| | | | | | | 220/270 |
| 2005/0274724 | A1 | * | 12/2005 | Goggin | .................. | B65D 39/08 |
| | | | | | | 220/257.1 |
| 2008/0232927 | A1 | * | 9/2008 | Trimble | .................. | F16B 37/14 |
| | | | | | | 411/429 |
| 2010/0258563 | A1 | * | 10/2010 | Parrinello | ................. | B26F 1/18 |
| | | | | | | 220/270 |
| 2012/0227854 | A1 | * | 9/2012 | Zeyfang | ................ | F16L 57/005 |
| | | | | | | 138/96 T |

FOREIGN PATENT DOCUMENTS

| CN | 101445175 | 6/2009 |
| CN | 202072098 | 12/2011 |
| CN | 202213827 | 5/2012 |
| CN | 103727301 | 4/2014 |
| CN | 203656352 | 6/2014 |
| EP | 1076327 | 2/2001 |
| EP | 1455326 | 9/2004 |
| JP | S58196785 | 12/1983 |
| JP | S59191323 | 12/1984 |
| JP | S01072036 | 5/1989 |
| JP | H04504245 | 7/1992 |
| JP | H08318968 | 12/1996 |
| JP | 2007326615 | 12/2007 |
| JP | 2013086824 | 5/2013 |
| WO | 2005056411 | 6/2005 |

OTHER PUBLICATIONS

Extended European search report for European appl. No. 14875761.0, dated May 17, 2017 (7 pages).
Notification of Reasons for Refusal for Japanese appl. No. 2016-561064, dated Jun. 26, 2017 (4 pages, including machine translation).

* cited by examiner

TAMPER-EVIDENT DEVICE AND VALVE USING SAME

FIELD

The present invention relates to a tamper-evident device for valve, in particular a tamper-evident device for IBC.

BACKGROUND

Composite Intermediate Bulk Container (IBC), commonly known as tons packaging plastic barrels, comprises a liner and a frame. Composite Intermediate Bulk Container (IBC) can be used repeatedly. The cost can be significantly reduced when it is used to be filled, stored or transported. A discharging valve is installed at the bottom of the composite intermediate bulk containers (IBC) so as to facilitate to discharging residue from the container. However, during transportation, tamper-evident device needs to be installed on the valve to prevent materials stored from being stolen.

In current valve tamper-evident device for composite intermediate bulk container (IBC), a plurality of holes are usually provided on a screw cap, and corresponding holes are usually provided on the valve body or handle of the valve. Then, binding strips are used to pass through the holes on the screw cap and the holes on the valve body or handle, so as to lock the screw cap, which cannot be unscrewed. Disadvantageous of this tamper-evident device is that the valve is located in a narrow pit at the bottom of IBC, and installation and removal operation of the binding strips is very difficult and generally requires tools, thus cause inconvenience to the operator.

For example, Chinese Patent CN2640951Y discloses another tamper-evident device for valve, that is, an anti-theft plastic cover equipped with an anti-theft bar. The plastic cover includes the anti-theft bar and a screw cover. A protrusion is provided on the screw cover to be interlocked with a protrusion provided on the container mouth. Toothed sheets used to be snapped on the container mouth are densely arranged inside of the anti-theft bar. The anti-theft bar is connected to the screw cover through small plastic pieces evenly arranged along the periphery of the anti-theft bar. The small plastic pieces are located at the narrow gap between the upper screw cover and the lower anti-theft bar. Disadvantages of this tamper-evident device for valve are as follows. The anti-theft bar is inconvenient, inefficient and very difficult to be installed. In order to open the container, it needs a tool or greater effort to destroy the anti-theft strip. As connecting portion of the body of the cover and the anti-theft strip is more weak, the body of the cover is easily broken, which affect the use of the valve. Manufacturing requirements and cost for anti-theft cover is high. The anti-theft cover and the anti-theft bar are connected as a whole. When opened, the anti-theft bar is disengaged from the anti-theft cover, thus the anti-theft cover cannot be reused, resulting in waste. Further, since the anti-theft bar is easily lost after disengaged from the anti-theft cover, it brings troubles for clearing surrounding environment.

In other tamper-evident devices, such as flanges on the valve welded to PE bags, since the size of the welding head of the flanges are secured, an anti-theft buckle must be assembled after completing welding, which is more complicated and easy to omit.

SUMMARY

The object of the present invention is to provide a tamper-evident device, convenient and simple to install and open, and some portion of the tamper-evident device can be recycled, to save cost and reduce the impact on the surrounding environment.

In order to achieve the above object, the present invention provides a tamper-evident device for a valve having a passage outlet on a body thereof, wherein the tamper-evident device includes:

an anti-theft buckle including anti-theft buckle body, pulling portion, tearable portion and elastic hook provided with position limiting surface, wherein the pulling portion is connected to the anti-theft buckle body via the tearable portion;

an anti-theft cover provided with position limiting contour and hook receiving portion; and a position limiting slot provided on the outer periphery of the passage outlet; wherein when the tamper-evident device is installed, the anti-theft cover is connected to the passage outlet, the elastic hook being snapped into the hook receiving portion along the limiting contour and engaged with the position limiting slot, such that the relative positions of the anti-theft cover and the body of the valve are limited.

Preferably, the pulling portion is a pulling loop and the elastic hook is provided with a snapping surface engaged with the hook receiving portion.

Preferably, one end of the tearable portion extends to a position close to the snapping surface of the elastic hook; the tearable portion can be torn from the anti-theft buckle body through pulling the pulling portion, which causes the elastic hook to be deformed and pulled out of the hook receiving portion and the position limiting slot, so that the anti-theft buckle is detached from the anti-theft cover, and then the anti-theft cover can be detached from the body of the valve, wherein the tearable portion cannot be recovered after being torn.

Preferably, a guiding-in surface is provided on the anti-theft cover above the hook receiving portion; a guiding surface is provided on the elastic hook; the guiding-in surface is engaged with the guiding surface such that the elastic hook is guided and snapped into the hook receiving portion.

Preferably, the position limiting contour is a groove provided on the outer periphery of the anti-theft cover; the position limiting surface is engaged with the position limiting contour, so that the position limiting surface of the anti-theft buckle is closely engaged with the position limiting contour of the anti-theft cover when the tamper-evident device is installed.

Preferably, the width of the position limiting slot is wider than the width of the hook receiving portion; the position limiting slot is hidden inside the outer periphery of the anti-theft cover when the tamper-evident device is installed.

Preferably, the hook receiving portion is aligned with the position limiting slot after the tamper-evident device is installed.

Preferably, the anti-theft cover has two diametrically opposed position limiting contours and two diametrically opposed hook receiving portions; the anti-theft buckle has two corresponding diametrically opposed position limiting surfaces and two corresponding elastic hooks; and the passage outlet of the valve is provided with two diametrically opposed position limiting slots.

Preferably, both ends of the position limiting slot are provided with a position limiting wall, so that the elastic hook is limited between two position limiting walls when the elastic hook is snapped into the hook receiving portion.

Preferably, the tamper-evident device is made of a plastic material.

The present invention also provides a valve including a valve body and a valve cartridge, wherein the valve further includes the above tamper-evident device.

The tamper-evident device of the present invention is easy to be installed. It can be installed and opened without tools. In practice, it can effectively prevent the material stored in a container from being stolen, and the anti-theft cover can be reused which will save the cost for tamper-evident during transportation. The pulling loop can be torn without breaking off which will facilitate garbage collection and reduce the impact on the surrounding environment.

DRAWINGS

DETAILED DESCRIPTION

Figure 1:
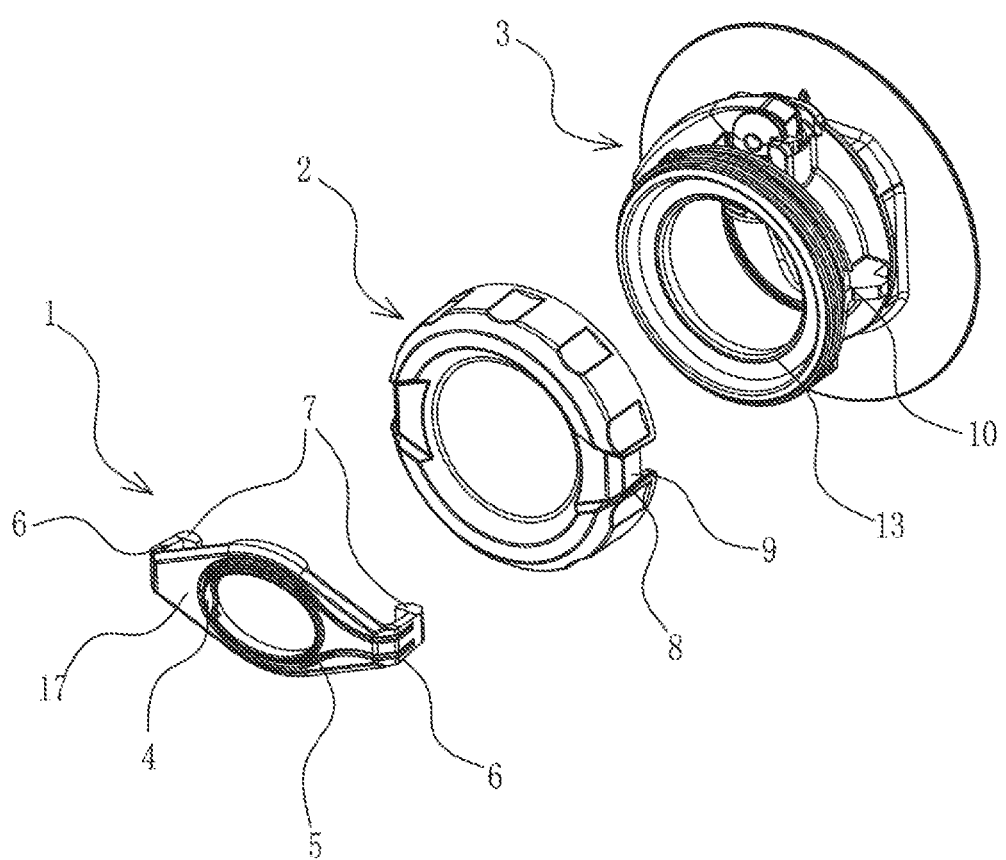
FIG. 1 is an exploded structural view of the tamper-evident device according to present invention.

Hereinafter, preferred embodiments of the present invention will be described in detail with reference to the drawings, so that the purposes, features and advantages of the present invention will be more clearly understood. It should be understood that embodiments shown in the drawings are not to limit the scope of the invention, but merely to illustrate the true spirit of the technical solution of the present invention. Herein, same or similar components are denoted by same reference numerals.

FIG. 1 shows an exploded structural view of the tamper-evident device according to present invention. As shown in FIG. 1, the tamper-evident device according to present invention includes anti-theft buckle 1 and anti-theft cover 2, wherein the anti-theft buckle 1 is provided with a pulling loop 4 and symmetrical elastic hooks 7. Both sides of each of the elastic hooks are called position limiting surface 6. A tearable portion 5 is connected between the pulling loop 4 and a body 17 of the anti-theft buckle. The anti-theft cover 2 is provided with symmetrical position limiting contours 8 and hook receiving portions 9, wherein the position limiting contours 8 are engaged with the position limiting surfaces 6 of the anti-theft buckle 1. The tamper-evident device needs to be engaged with corresponding parts of the valve to completing assembling. The body 3 of the valve is provided with screw structure on the passage outlet 3 to be engaged with the anti-theft cover. Position limiting slots 10, used to prevent the anti-theft cover from rotating after the tamper-evident device is installed, are provided on the symmetrical positions of the screw structure.

Preferably, the anti-theft buckle 1, anti-theft cover 2 and the body 3 of the valve are made of plastic materials.

Figure 2A:
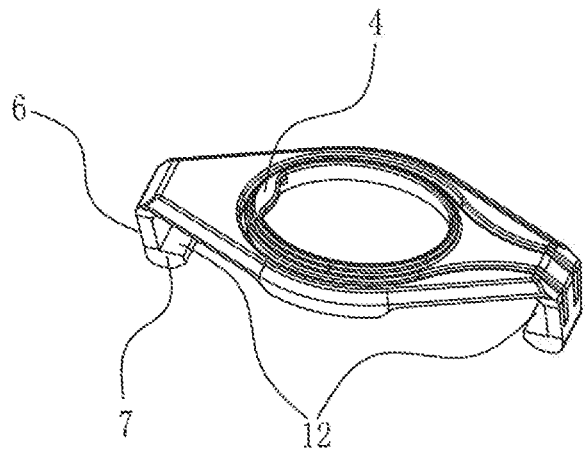
FIGS. 2A-2C are perspective structural schematic views of the anti-theft buckle of the tamper-evident device according to present invention.
Figure 2B:
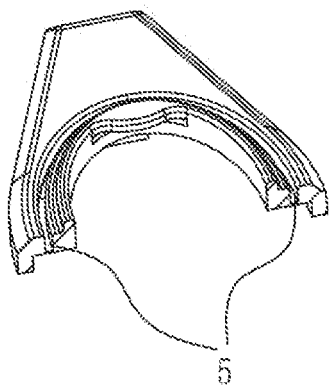
Figure 2C:
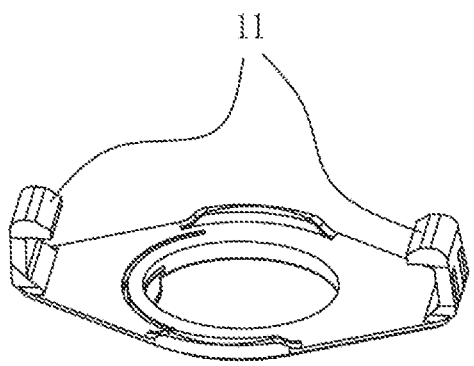

FIGS. 2A-2C show the structure of the anti-theft buckle 1 in different directions according to the present invention. As can be seen from the FIGS. 2A-2C, the elastic hook 7 is provided with guiding surface 11 and snapping surface 12. The tearable portion 5 connected between the pulling loop 4 and a body 17 of the anti-theft buckle is so thin that it is easy to be torn, and one end of the tearable portion 5 extends to a position close to the snapping surface 12 of the elastic hook.

Figure 3A:
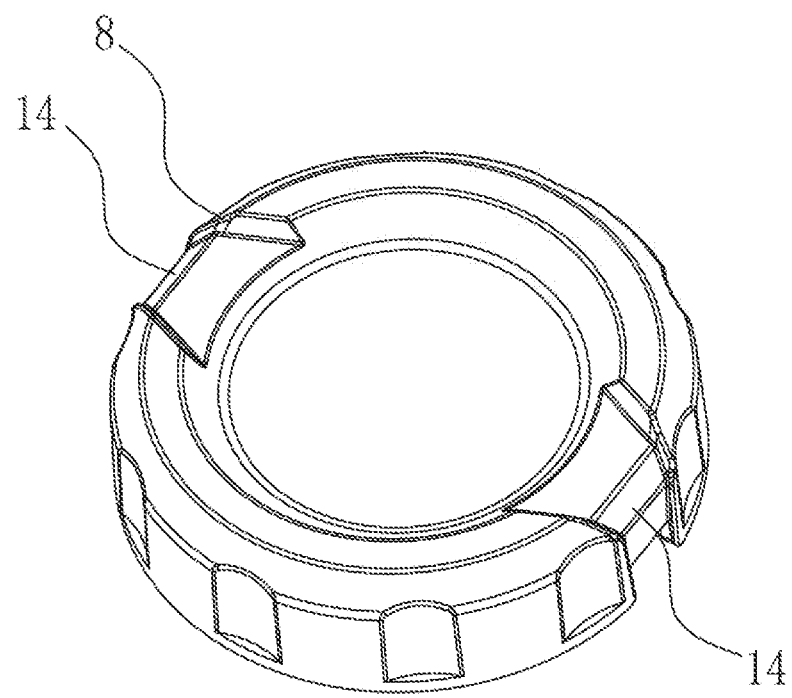
FIGS. 3A and 3B are schematic structural views of the anti-theft cover of the tamper-evident device according to present invention.
Figure 3B:
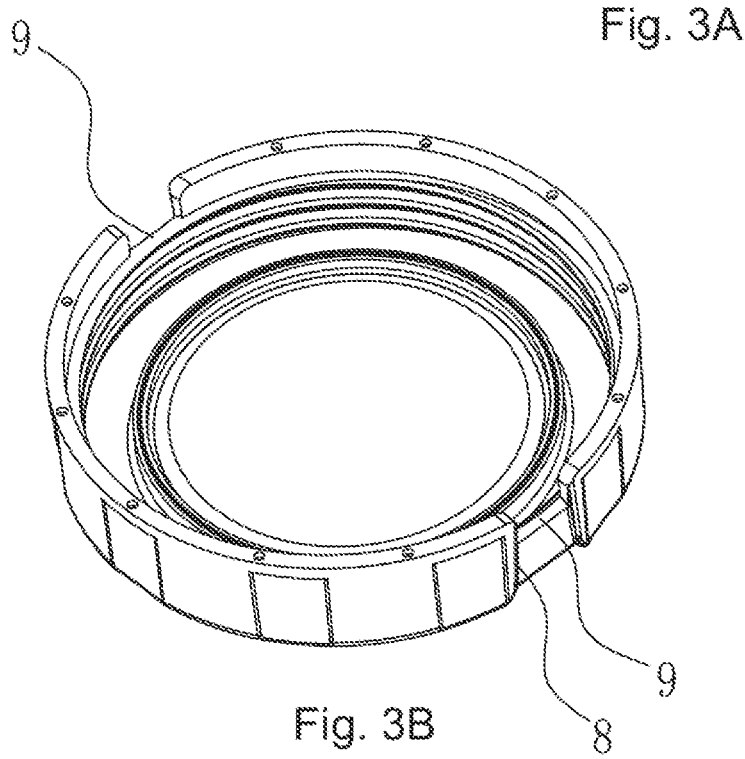

FIGS. 3A and 3B are schematic structural views of the anti-theft cover 2 of the tamper-evident device according to present invention. As can be seen from FIGS. 3A-3B, a guiding-in surface 14, used to guiding the anti-theft buckle when being installed, is provided on the anti-theft cover above the hook receiving portion 9.

Figure 4A:
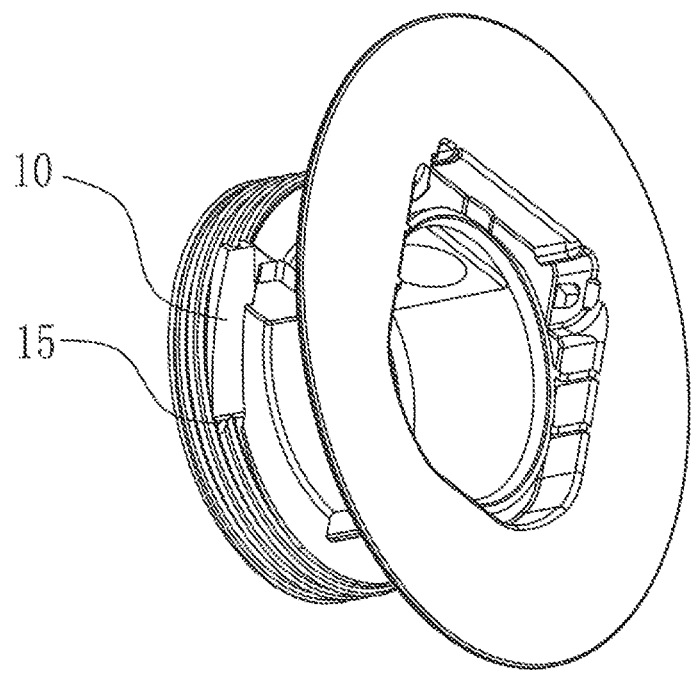
FIGS. 4A and 4B are schematic structural views of the valve body of the tamper-evident device according to present invention.
Figure 4B:
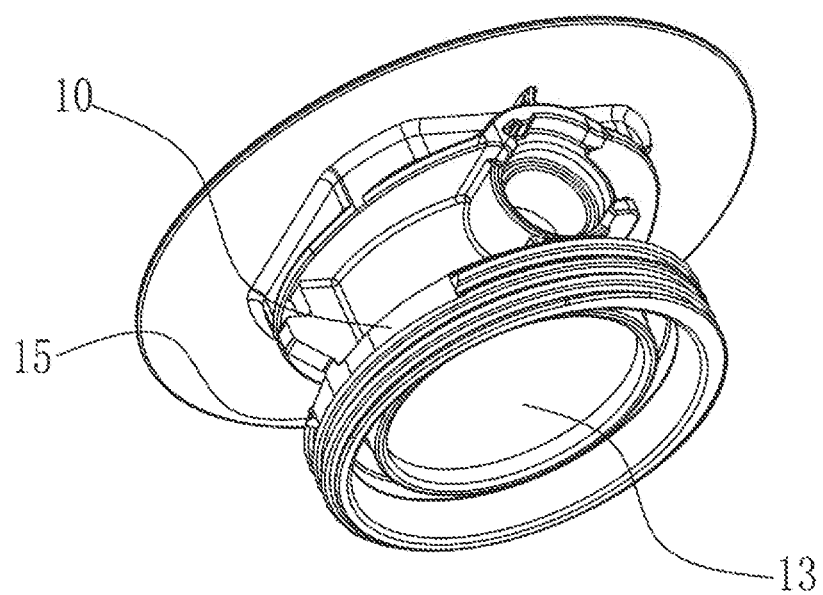
Figure 5A:
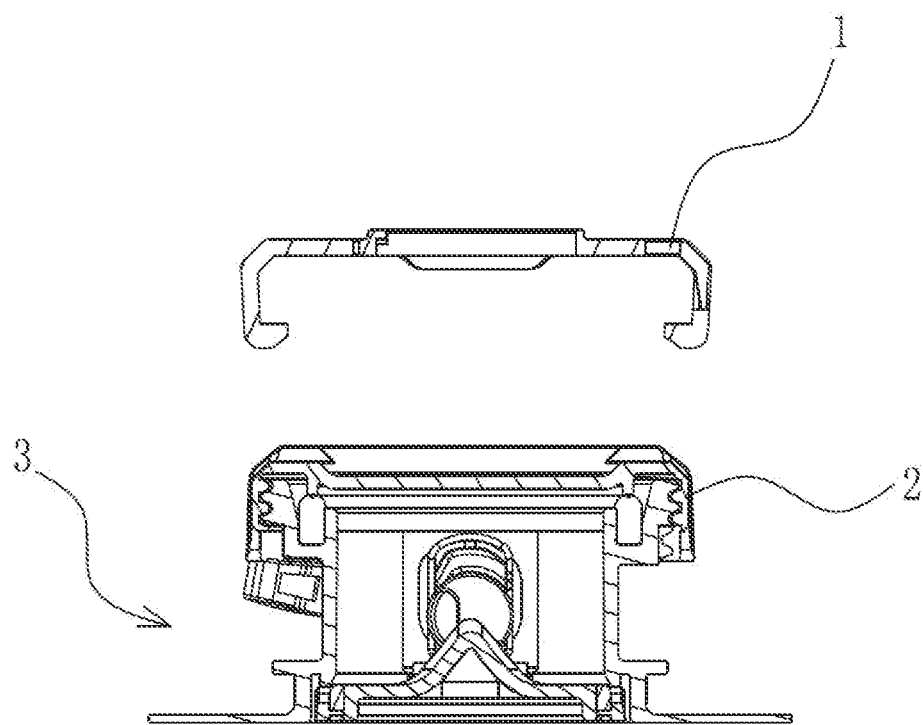
FIGS. 5A-5E are sectional schematic views of the tamper-evident device according to present invention, showing the process of installing the anti-theft buckle on the valve.
Figure 5B:
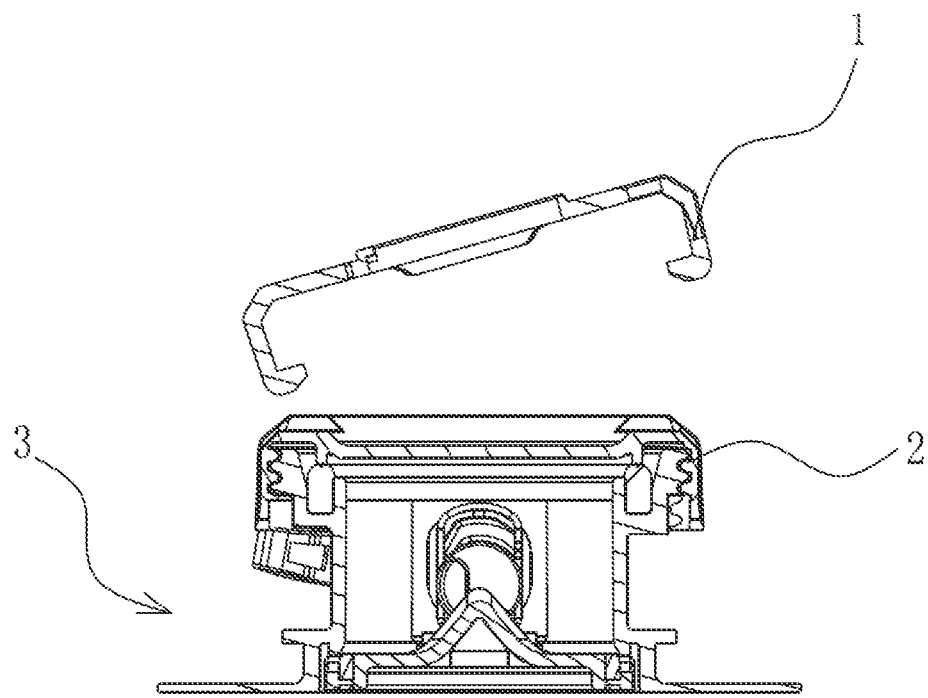
Figure 5C:
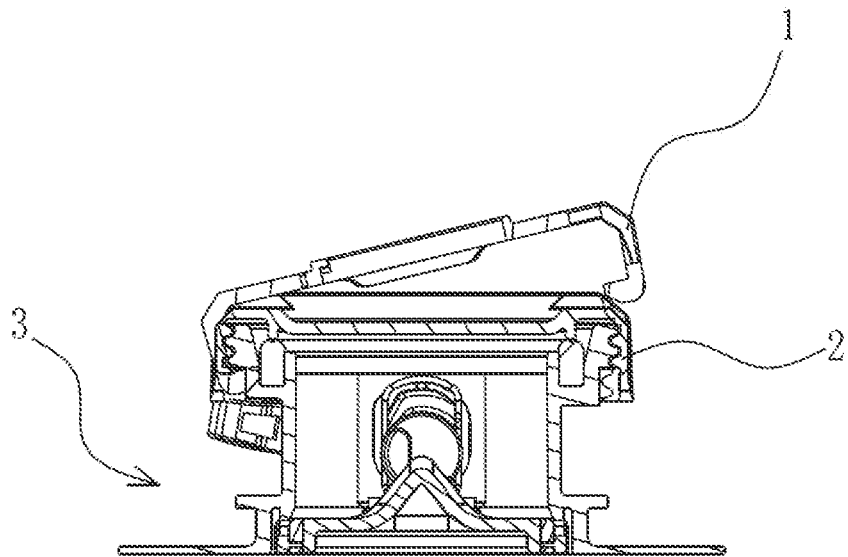
Figure 5D:
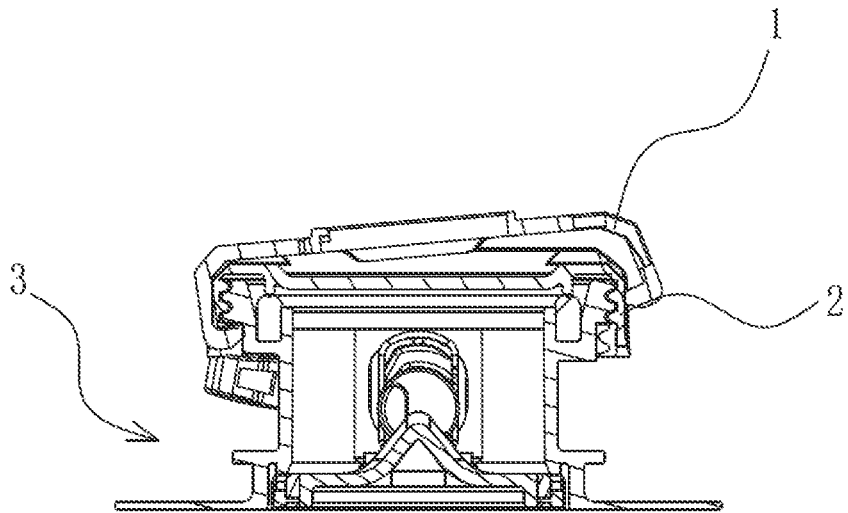
Figure 5E:
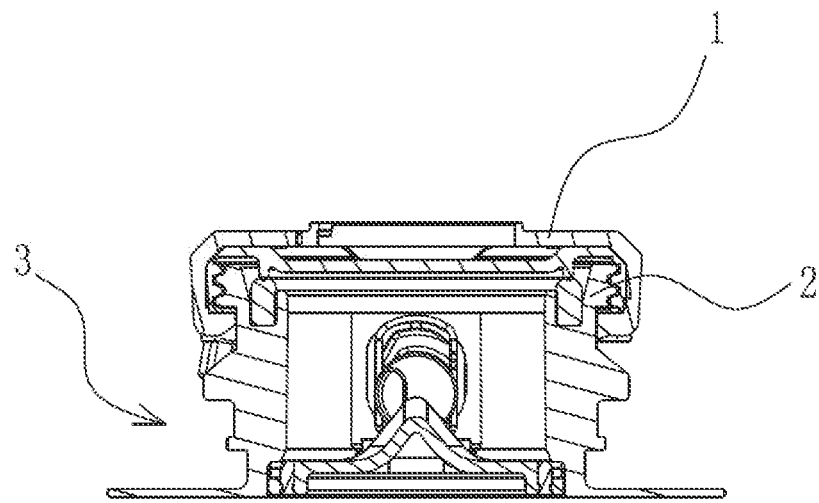

FIGS. 4A and 4B show schematic structure views of the valve body of the tamper-evident device according to present invention. Both end surfaces of the position limiting slot 10 provided on the screw structure are called position limiting wall 15. The width of the position limiting slot 10, i.e. the distance between the both position limiting walls 15, is wider than the width of the hook receiving portion 9, and the hook receiving portion 9 is aligned with the position limiting slot 10 after the anti-theft cover 2 is installed on the passage outlet 13 of the valve body.

It should be understood, the passage outlet of the valve body 3 can be made into other structures. The pulling loop may also be other shapes, such as pulling bar, as long as it can provide position for users to hold it.

When used, firstly, the anti-theft cover 2 is screwed tightly on the passage outlet 13 of the valve body 3, wherein the hook receiving portion 9 is approximately aligned with the position limiting slot 10, and then the anti-theft buckle 1 is mounted on the anti-theft cover and the valve body 3 as a whole.

FIGS. 5A-5E show the process of the anti-theft buckle installing on the valve in the form of sectional view. When installed, the elastic hook 7 of the anti-theft buckle 1 is engaged with the guiding-in surface 14 of the anti-theft cover, wherein the elastic hook 7 is pressed, elastic deformed, sliding downward, and then snapped into the position limiting slot 10, as well as the snapping surface 12 is tightly hooked to the hook receiving portion 9 of anti-theft cover 2.

Figure 6:
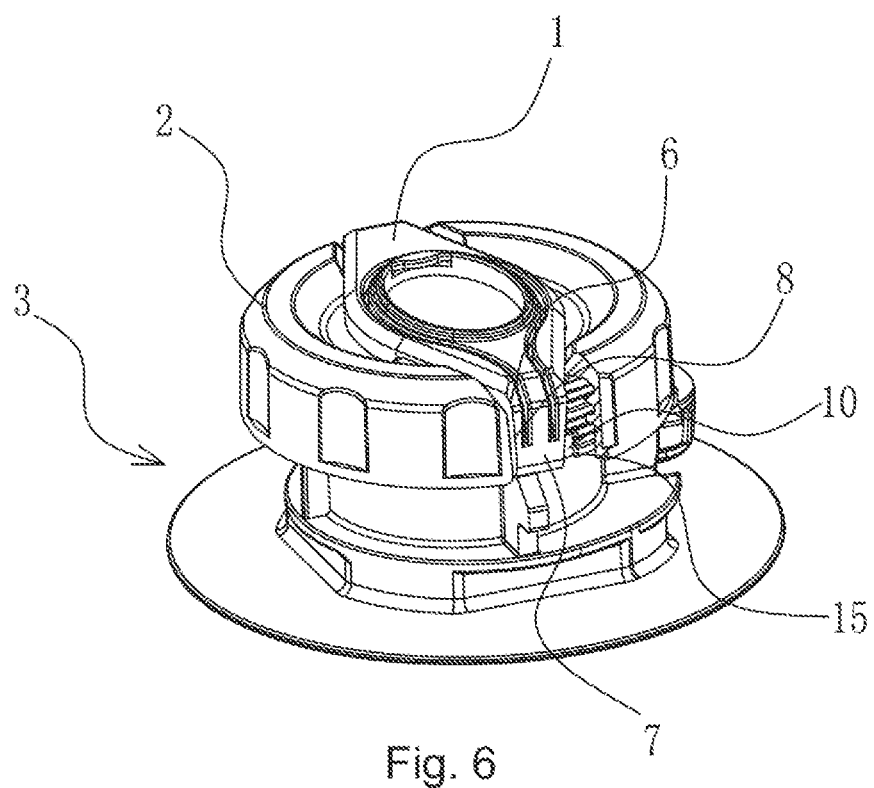
FIG. 6 is perspective structural schematic view of the tamper-evident device when assembled according to present invention.
Figure 7A:
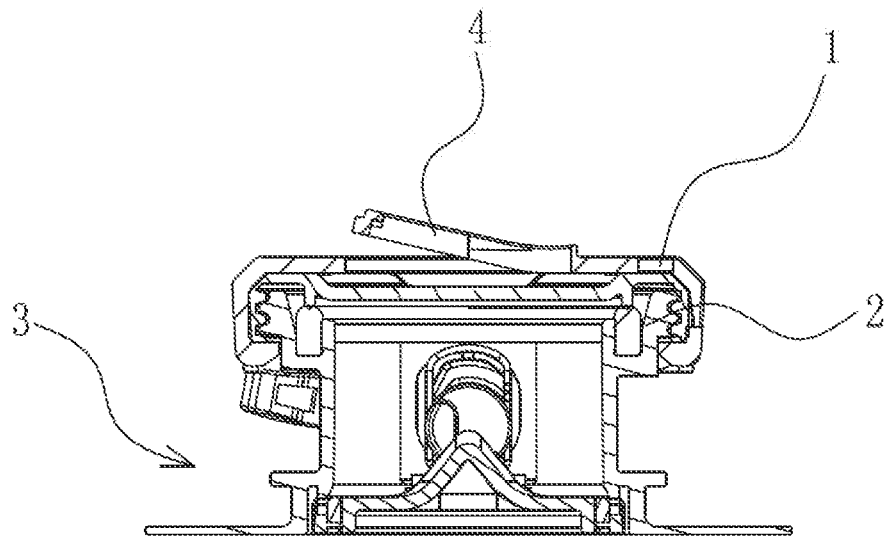
FIGS. 7A-7G are the sectional schematic views of the tamper-evident device according to present invention, showing the process of the anti-theft buckle being opened from the valve and pulled out.
Figure 7B:
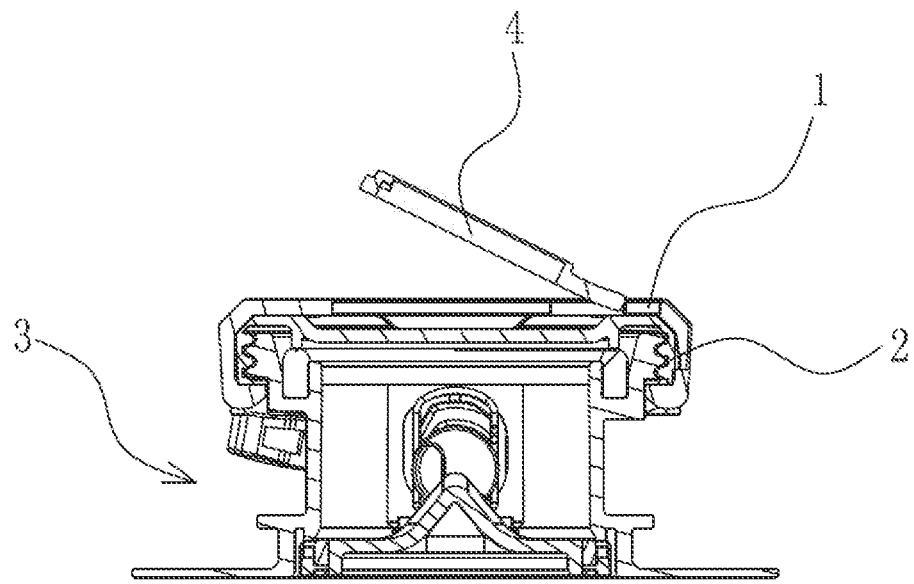
Figure 7C:
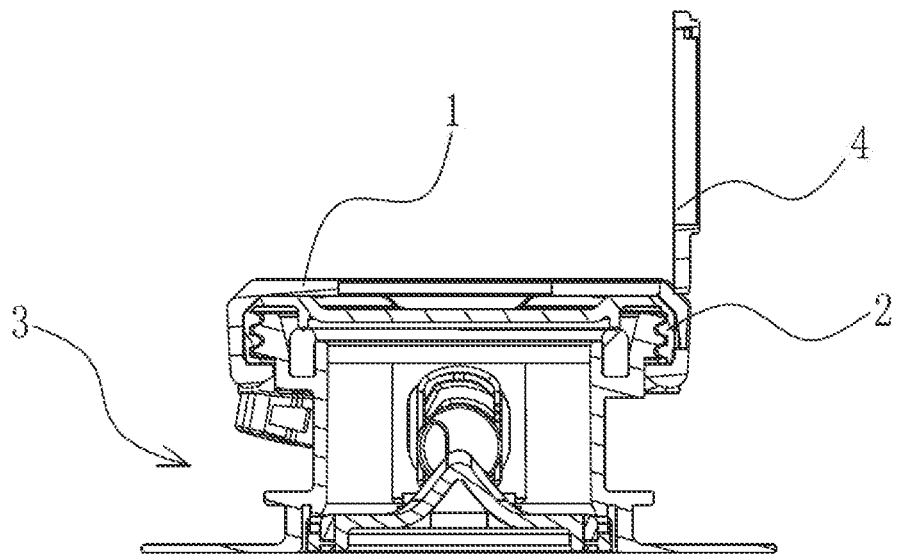
Figure 7D:
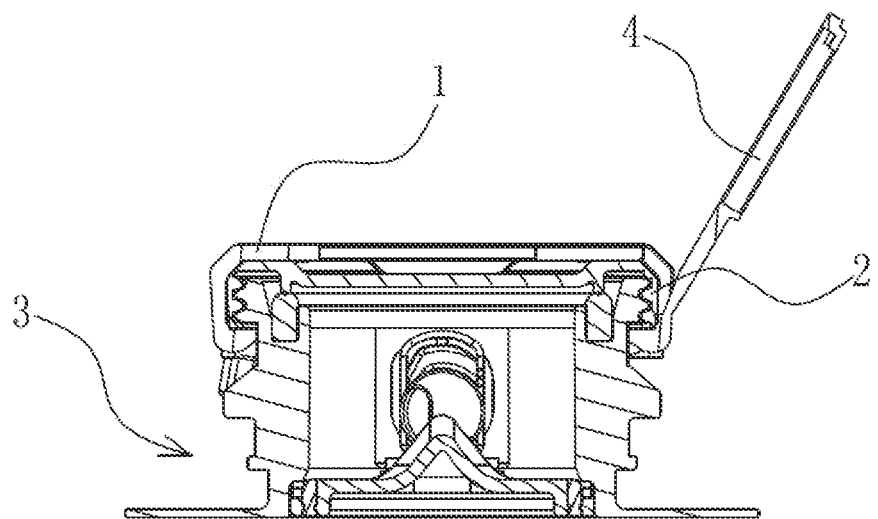
Figure 7E:
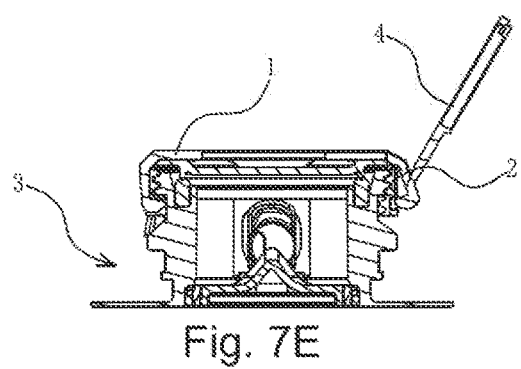
Figure 7F:
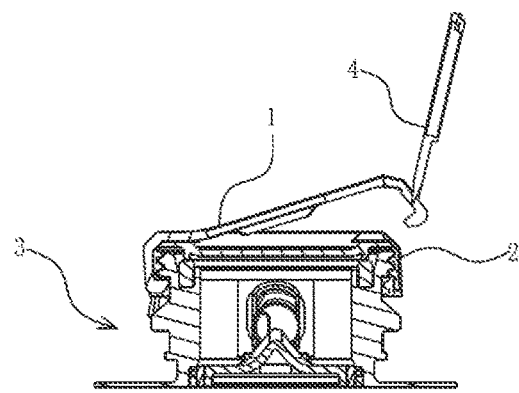
Figure 7G:
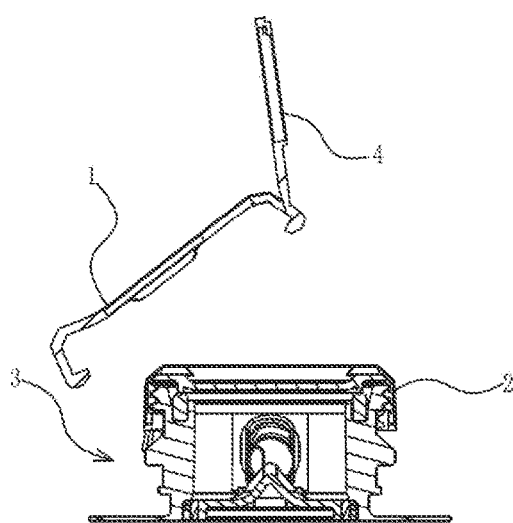

FIG. 6 is a perspective structural schematic view of the tamper-evident device according to present invention after assembling. In FIG. 6, the tamper-evident device is partially cut away to better illustrate the connecting relationship among the anti-theft buckle 1, the anti-theft cover 2 and the valve body 3 after completing assembling. As shown in FIG. 6, the anti-theft cover 2 is screwed on the valve body 3. The snapping surface 12 of the elastic hook 7 is tightly hooked on the hook receiving portion 9. The position limiting surface 6 of the elastic hook 7 is tightly engaged with the position limiting contour 8, so that the position of the anti-theft buckle 1 relative to the anti-theft cover 2 is secured. The elastic hooks 7 are respectively snapped into the position limiting slots 10 and each of the elastic hooks 7 is limited between the two position limiting walls 15, so that the rotation of the anti-theft cover 2 relative to the valve body 3 is restricted. Furthermore, the position limiting contour 8 is a groove provided on the periphery of the anti-theft cover. The position limiting surface 6 is tightly engaged with the position limiting contour 8 after completing assembling, and the excess width of the position limiting slot 10 is hidden behind the periphery of the anti-theft cover 2. It is very difficult to remove the anti-theft buckle 1 from the valve through pulling out the elastic hook 7, which effectively prevent the anti-theft cover from being removed during transportation and the material in the container being stolen.

FIGS. 7A-7G are the sectional schematic views of the tamper-evident device according to present invention, showing the process of the anti-theft buckle being opened from the valve and pulled out. As shown in FIGS. 7A-7G, when opened, the pulling loop 4 of the anti-theft buckle 1 is pulled up, the tearable portion 5 being torn, and the pulling loop 4 is continually pulled until the tearable portion 5 is torn to the end thereof. The strength and elasticity of the elastic hook on the end of the tearable portion become weakened, and continually pulling the pulling loop 4 may cause one elastic hook to be deformed and pulled out. Then, another elastic hook is pulled out, so that the anti-theft buckle is disengaged from the valve. In this case, the anti-theft cover 2 may be unscrewed from the valve body 1, so as to open the valve to discharge the material.

The tamper-evident device of the present invention is easy to be installed. It can be installed and opened without tools. In practice, it can effectively prevent the material stored in a container from being stolen, and the anti-theft cover can be reused which will save the cost for tamper-evident during transportation. The pulling loop can be torn without breaking off which will facilitate garbage collection and reduce the impact on the surrounding environment.

Preferred embodiments of the present invention has been described in detail above, while it is to be understood that, after reading the above teachings of the present invention, those skilled in the art may make various modifications or amendments to the present invention. These equivalent forms still fall into the scope limited by appended claims of the present application.

What is claimed is:

1. A tamper-evident device for a valve having a passage outlet on a body thereof, comprising:
   an anti-theft buckle including anti-theft buckle body, pulling portion, tearable portion and elastic hook provided with a position limiting surface, wherein the pulling portion is connected to the anti-theft buckle body via the tearable portion;
   an anti-theft cover provided with position limiting contour and hook receiving portion; and
   a position limiting slot provided on the outer periphery of the passage outlet,
   wherein when the tamper-evident device is installed, the anti-theft cover is connected to the passage outlet, the elastic hook being snapped into the hook receiving portion along the limiting contour and engaged with the position limiting slot, such that the relative positions of the anti-theft cover and the body of the valve are limited, and wherein one end of the tearable portion extends to a position close to a snapping surface of the elastic hook; the tearable portion can be torn from the anti-theft buckle body through pulling the pulling portion, which causes the elastic hook to be deformed and pulled out of the hook receiving portion and the position limiting slot, so that the anti-theft buckle is detached from the anti-theft cover, and then the anti-theft cover can be detached from the body of the valve, wherein the tearable portion cannot be recovered after being torn.

2. The tamper-evident device of claim 1, wherein the pulling portion is a pulling loop and the elastic hook is provided with a snapping surface engaged with the hook receiving portion.

3. The tamper-evident device of claim 1, wherein a guiding-in surface is provided on the anti-theft cover above the hook receiving portion; a guiding surface is provided on the elastic hook; the guiding-in surface is engaged with the guiding surface such that the elastic hook is guided and snapped into the hook receiving portion.

4. The tamper-evident device of claim 1, wherein the position limiting contour is a groove provided on the outer periphery of the anti-theft cover; the position limiting surface is engaged with the position limiting contour, so that the position limiting surface of the anti-theft buckle is closely engaged with the position limiting contour of the anti-theft cover when the tamper-evident device is installed.

5. The tamper-evident device of claim 1, wherein the width of the position limiting slot is wider than the width of the hook receiving portion; the position limiting slot is hidden inside the outer periphery of the anti-theft cover when the tamper-evident device is installed.

6. The tamper-evident device of claim 1, wherein the hook receiving portion is aligned with the position limiting slot after the tamper-evident device is installed.

7. The tamper-evident device of claim 1, wherein the anti-theft cover has two diametrically opposed position limiting contours and two diametrically opposed hook receiving portions; the anti-theft buckle has two corresponding diametrically opposed position limiting surfaces and two corresponding elastic hooks; and the passage outlet of the valve is provided with two diametrically opposed position limiting slots.

8. The tamper-evident device of claim 1, wherein both ends of the position limiting slot is provided with a position limiting wall, so that the elastic hook is limited between two position limiting walls when the elastic hook is snapped into the hook receiving portion.

9. The tamper-evident device of claim 1, wherein the tamper-evident device is made of a plastic material.

10. A valve including a valve body and a valve cartridge, wherein the valve further includes the tamper-evident device of claim 1.

* * * * *